Dec. 16, 1969  R. C. ROBERTS  3,484,669

SYNCHRONOUS MOTOR EXCITATION CONTROL SYSTEM

Filed July 10, 1967  2 Sheets-Sheet 1

INVENTOR.
ROBERT C. ROBERTS

BY

HIS ATTORNEY

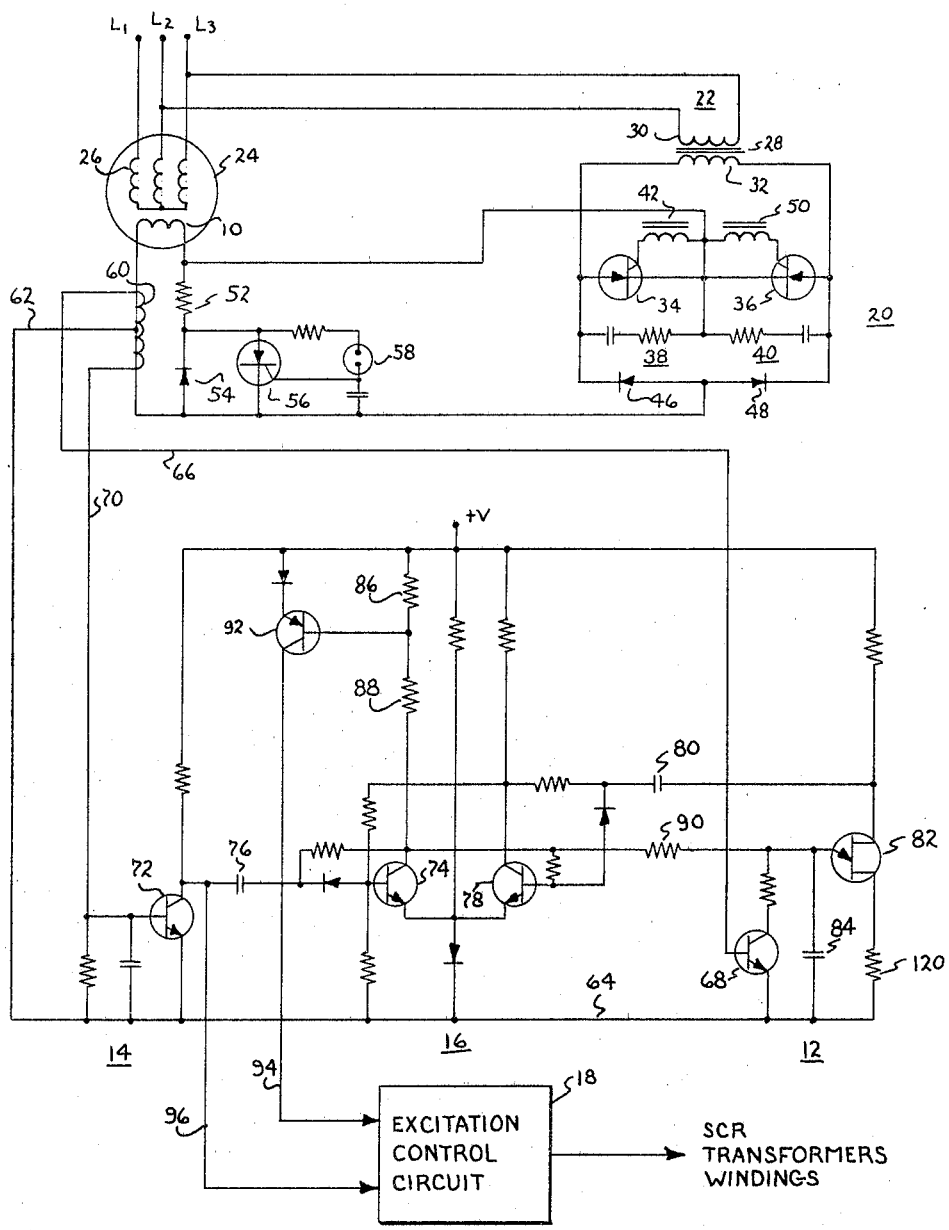

United States Patent Office 3,484,669
Patented Dec. 16, 1969

3,484,669
SYNCHRONOUS MOTOR EXCITATION CONTROL
SYSTEM
Robert C. Roberts, Salem, Va., assignor to General
Electric Company, a corporation of New York
Filed July 10, 1967, Ser. No. 652,150
Int. Cl. H02p 5/40
U.S. Cl. 318—176                                    4 Claims

ABSTRACT OF THE DISCLOSURE

For controlling the excitation of a synchronous motor, a system including a capacitor charged at a set rate during negative half cycles of induced field current and discharged through a parallel transistor during positive half cycles. As the motor accelerates toward synchronous speed during starting, the capacitor voltage becomes increasingly greater during the increasingly longer negative half cycles. At a threshold speed, the voltage built up during a negative half cycle triggers a unijunction transistor. At the start of the succeeding positive half cycle, a second unijunction transistor responds to fire SCR's which permit excitation of the motor field.

BACKGROUND OF THE INVENTION

The present invention relates to motor control systems and more particularly to a solid state synchronous motor control system for controlling the excitation of the field winding of a synchronous motor.

Prior art excitation control systems for synchronous motors generally include electromechanical relays which perform the necessary switching functions. Such relays are subject to many disadvantages among which are their size, cost, and low life expectancy due to the vibrations and atmospheric contaminants to which they are subjected. A further disadvantage of these relays is their slow response which often results in high torque transients because excitation voltage is not applied to a field winding through the relay at the proper time. Attempts have been made to replace electromechanical systems with solid state systems to avoid the enumerated problems. The present invention is an improvement on such attempts.

SUMMARY OF THE INVENTION

The present invention is a completely solid state synchronous motor control system having a bistable circuit which operates either in a first mode or in a second mode. The system further includes a threshold speed detector which responds when the motor is at or above a threshold speed to produce an output signal which controls the mode of operation of the bistable circuit. More specifically, the threshold speed detector drives the bistable circuit into its second mode during each negative half cycle of induced field current when the motor speed exceeds the threshold speed. An excitation control circuit has inputs both from the bistable circuit and from the field winding of the motor. The excitation control circuit responds at the beginning of a positive half cycle of induced current in the field winding following a signal which indicates that the bistable circuit is operating in its second mode to permit the field winding to be excited from a rectified A.C. source.

DESCRIPTION OF THE DRAWINGS

While the specification concludes with claims particularly pointing out and distinctly claiming that which is regarded as the present invention, the details of the invention along with its further objects and advantages will be more readily ascertained from the following detailed description when read in conjunction with the accompanying drawings in which:

FIG. 2 is a schematic diagram showing part of the circuits represented in block diagram form in FIG. 1.

DETAILED DESCRIPTION

Figure 1:
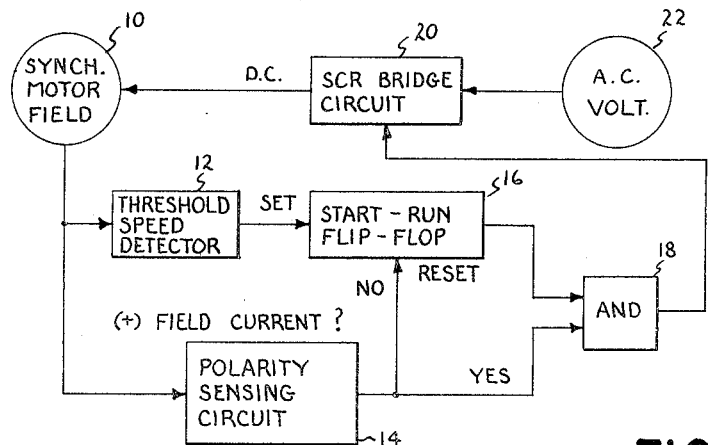
FIG. 1 is a block diagram showing the significant components of a system constructed in accordance with the present invention.

Referring now to FIG. 1, a current established by the voltage induced in a field winding 10 of a synchronous motor operating at subsynchronous speeds is applied both to a threshold speed detector 12, and to a polarity sensing circuit 14 which produces a high voltage output signal whenever the field current has a positive polarity. When the motor is running at or above a subsynchronous threshold speed, the threshold speed detector 12 produces a signal during the latter part of a negative half cycle which sets a start-run flip-flop 16. Early in each negative half cycle, the polarity sensing circuit 14 produces a resetting signal for the flip-flop 16. As the induced field current goes from negative to positive at the end of the half cycle during which the flip-flop 16 is set, the circuit 14 produces the high voltage signal which is combined with a high voltage signal from the flip-flop 16 in an excitation control circuit which effectively acts as an AND gate 18. The output of the AND gate 18 is applied to an SCR bridge circuit 20 interposed between an A.C. voltage source 22 and the field winding 10. While the AND circuit 18 is enabled by the signals from flip-flop 16 and polarity sensing circuit 14, the voltage source 22 applies an excitation voltage through SCR bridge circuit 20 to the synchronous motor field winding 10.

In FIG. 2 the elements shown in block diagram form are revealed in more detail. A synchronous motor 24 includes the field winding 10 and a three-phase armature or stator winding 26 energized from an external 60 c.p.s. power source (not shown) through power lines L1, L2, and L3. The excitation voltage source 22 includes a transformer 28 having its primary winding 30 connected across power lines L2 and L3 and its secondary winding 32 connected across SCR bridge circuit 20. More specifically, the left terminal of the secondary winding 32 is connected to the anode of a first controlled rectifier or SCR 34 whereas the right terminal of the winding 32 is connected to the anode of a second controlled rectifier or SCR 36. The SCR 34 is connected in parallel with an RC filter circuit 38. Similarly, the SCR 36 is connected in parallel with an RC filter circuit 40. When the SCR 34 is triggered into conduction on alternate half cycles by a positive gate-to-cathode voltage across a transformer winding 42, a conductive path for excitation current is formed through the SCR 34, the field winding 10, a diode 48, and secondary winding 32. When the SCR 36 is triggered into conduction during the opposite alternating half cycles, a conductive path is formed through SCR 36, field winding 10, a diode 46, and secondary winding 32. SCR 36 is driven into conduction in the same manner as SCR 34; i.e., by a positive gate-to-cathode voltage appearing across a transformer winding 50 connected between those two terminals on SCR 36. The voltages appearing across the gate-to-cathode transformer windings 42 and 50 are established by an excitation control circuit described later.

When the synchronous motor 24 is first energized by closing mainline contactors (not shown) in the power lines L1, L2, and L3, a rotating electric field is established in the armature winding 26. Since the field winding 10 is initially at rest, the relative motion between the field winding 10 and the rotating electric field causes alternating currents to be induced in the field winding 10. Positive induced field current, defined as current flowing from right to left through the field winding 10, travels through a closed conductive path including a field discharge resistor 52 and a diode 54. If the induced field current is negative, the conductive path includes the discharge resistor 52 and an SCR 56 triggered by the breakdown of a parallel neon tube 58. The breakdown voltage of neon tube 58 is selected to be higher than the normal excitation voltage and lower than the induced field voltage encountered during starting operations so that the SCR 56 is triggered during each negative half cycle during starting. Changes in the induced field current are picked up by a current transformer 60 having a center tap lead 62 connected to a common voltage terminal 64, an upper lead 66 connected to the base of a transistor 68 in the threshold speed detector 12 and a lower lead 70 connected to the base of a transistor 72 in the polarity sensing circuit 14.

The collector terminal of the transistor 72 is coupled to the base of a transistor 74 in the start-run flip-flop 16 through capacitor 76. The second transistor 78 in the start-run flip-flop 16 is connected through a capacitor 80 to one base terminal of a threshold device which, in a preferred embodiment, is a unijunction transistor 82 in the threshold speed detector 12. The threshold speed detector 12 further includes a charging capacitor 84 connected between the common terminal 64 and the emitter terminal of the unijunction transistor 82. When the transistor 68 is not conducting, the capacitor 84 is charged at a set rate by a positive voltage source (+V) through a resistor chain including resistors 86, 88, and 90. When the transistor 68 is conducting, however, the charging current is shunted to the common terminal 64 while charging capacitor 84 discharges through the transistor. Depending upon the mode of operation of start-run flip-flop 16, an output transistor 92 having its base terminal connected to the junction of resistors 86 and 88 is either conducting or non-conducting. The collector terminal of output transistor 92 is connected to one input of the excitation control circuit referred to as an AND gate 18 in FIG. 1. The second input to the excitation control circuit, referred to hereafter by numeral 18, is provided by a lead 96 connected to the collector terminal of the transistor 72 in the polarity sensing circuit 14.

Figure 3:
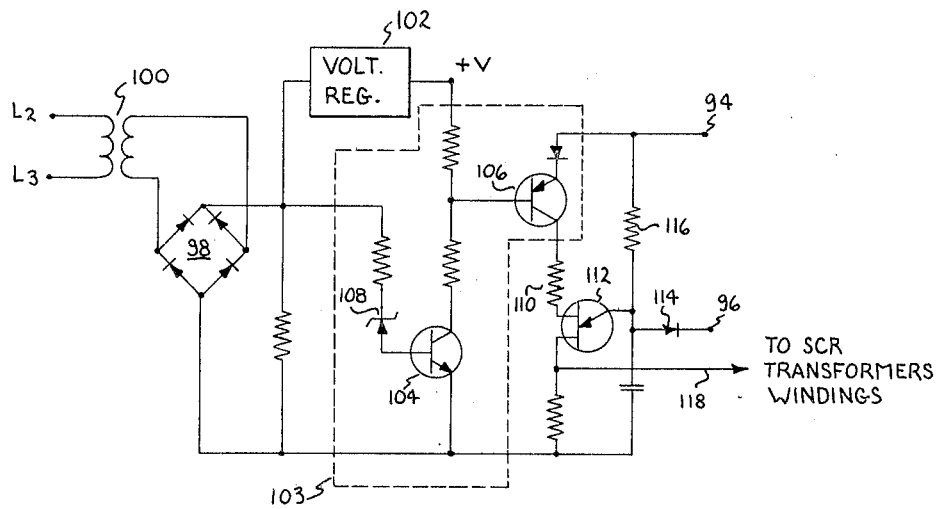
FIG. 3 is a schematic diagram showing the remainder of the circuits depicted in block diagram form in FIG. 1.

The excitation control circuit 18, shown schematically in FIG. 3, includes a full wave diode bridge 98 connected to power lines L2 and L3 through a stepdown transformer 100. The diode bridge 98 provides full wave rectification of the 60 c.p.s. A.C. voltage appearing across power lines L2 and L3. The pulsating 120 c.p.s. D.C. voltage obtained is applied to a voltage regulator 102 which produces the constant D.C. voltage (+V) used to bias the elements in the system. The pulsating D.C. voltage is also applied to a Zener diode 108 connected to the base terminal of a transistor 104, part of a square wave amplifier 103. When the pulsating D.C. voltage exceeds the reverse breakdown voltage of the Zener diode 108, transistor 104 is driven into conduction. Consequently, transistor 106 is driven into conduction to form a highly conductive path between the lead 94 and the upper end of a resistor 110 in a base circuit for a threshold device such as unijunction transistor 112. The emitter terminal of the unijunction transistor 112 is connected to the lead 94 from start-run flip-flop 16 through a biasing resistor 116 and to the lead 96 from the polarity sensing circuit 14 through a diode 114. If no signal voltage appears on lead 96, the diode 114 becomes part of a discharge path which prevents the firing of the unijunction transistor 112 regardless of the voltage appearing on the terminal 94. However, if high voltages appear on both terminals 94 and 96, the unijunction transistor 112 is fired at a rate set by the square wave amplifier 103 including transistors 104 and 106. Each time the unijunction transistor 112 fires, a positive voltage is established on lead 118 connected to a base terminal of the unijunction transistor 112. The positive voltage is applied to transformer windings which are magnetically coupled to the transformer windings 42 and 50 in the SCR bridge circuit 20. Because the full wave rectified voltage applied to Zener diode 108 has a frequency of 120 c.p.s., the square wave amplifier 103 applies a triggering voltage to the unijunction transistor 112 during each period of $\frac{1}{120}$ seconds or 8.3 milliseconds.

The system described above operates in the following manner to control the excitation of the field winding 10. Mainline contactors in the power lines L1, L2, and L3 are closed to establish a rotating electric field in the armature winding 26 as well as to energize the diode bridge 98 and thus the voltage regulator 102. In turn, the voltage regulator 102 produces a positive D.C. voltage for certain of the semiconductor devices in the motor control system.

During each positive half cycle of current induced in the field winding 10 as the winding begins to rotate, a positive voltage established across current transformer 60 is applied to the base of transistor 68 to drive that transistor into conduction. When transistor 68 conducts, it short circuits capacitor 84 to discharge any charge accumulated on the capacitor during a previous negative half cycle. Also, during each positive half cycle, transistor 72 in the polarity sensing circuit 14 is driven into nonconduction by the negative voltage from lead 70 at its base terminal. As a result, the voltage at the collector terminal of the transistor 72 on lead 96 remains relatively high during positive half cycles. At the beginning of each negative half cycle, the reversed flow through current transformer 60 causes lead 70 to have a positive voltage which is applied to the base terminal of in transistor 72 to drive that transistor into conduction. The consequent drop in collector voltage for the transistor 72 is converted to a negative-going pulse by capacitor 76. The negative-going pulse is applied to the base terminal of the transistor 74 in the start-run flip-flop 16 to drive that transistor into its nonconducting or start condition if it previously had been in its conducting or run condition. During the starting sequence, the start-run flip-flop 16 should be in its start mode of operation wherein transistor 74 is not conducting while transistor 78 is conducting. When the flip-flop 16 is already in the start mode, the negative-going pulse has no effect.

If the flip-flop 16 is in its run mode when a negative current is induced in the field winding, a situation which occurs when a running motor begins to slow down under a heavy load, the negative-going pulse causes the flip-flop 16 to be returned to its start mode. Whether or not the flip-flop 16 remains in the start mode depends on whether the motor is running at subsynchronous speeds in excess of a threshold subsynchronous speed. If the motor speed is at or above the threshold speed, the threshold speed detector 12 operates in the following manner to drive the flip-flop 16 into its run mode.

At the beginning of each negative half cycle of induced field current, negative voltage appears on the base of the transistor 68 to drive that transistor into nonconduction. With the transistor 68 not conducting, current flows through resistors 86, 88, and 90 and into the capacitor 84 to build up the charge on that capacitor. If the field winding 10 is rotating at speeds below the threshold speed, the induced field current becomes positive to drive transistor 68 into conduction before the voltage across the capacitor 84 becomes great enough to fire the unijunction transistor 82. When the induced current becomes positive, the charge which had accumulated on the capacitor 84 during the negative half cycle is discharged through the transistor 68. As the field winding 10 approaches the threshold speed, the negative induced current cycles become longer and the charge across the capacitor 84 builds up to higher levels before the capacitor is discharged at the beginning of succeeding positive half cycles.

At the threshold speed, the induced field current stays negative long enough to drive the transistor 68 into nonconduction for a period of time which allows the capacitor 84 to accumulate a change of sufficient magnitude to fire the unijunction transistor 82. When the unijunction transistor 82 is fired, the charge accumulated on the capacitor 84 discharges through the unijunction transistor 82 and the base resistor 120 to the common voltage terminal 64. During this time, the voltage on the upper base terminal of unijunction transistor 82 drops. This negative-going voltage is shaped by capacitor 80 before being applied as a negative-going voltage pulse at the base terminal of the transistor 78 in the start-run flip-flop 16 to bias that transistor into nonconduction. Transistor 74 consequently is driven into conduction so that the flip-flop 16 begins to operate in its run mode wherein transistor 92 conducts due to the reduced voltage at its base terminal. With the transistor 92 conducting, a highly conductive path connects the positive voltage source (+V) to lead 94.

Although the flip-flop 16 is driven into its run mode during a negative half cycle and lead 94 carries a high voltage, transistor 72 conducts during the negative half cycles so that lead 96 carries only a low voltage. However, at the beginning of the positive half cycle following the negative half cycle during which the flip-flop 16 is driven into its run mode, transistor 72 is driven into nonconduction and high voltages exist concurrently on the leads 94 and 96 to the excitation control circuit 18. The high voltages appearing on leads 94 and 96 in the emitter circuit for the unijunction transistor allow that transistor to be switched on and off by the square wave voltage appearing at its upper base terminal. Each time the unijunction transistor 112 is switched on, a positive voltage pulse appears on the lead 118. As was mentioned earlier, this pulse is coupled through transformer windings to the gate-to-cathode transformer windings 42 and 50 for the SCR's 34 and 36, respectively, in the SCR bridge circuit 20. When the SCR's conduct, a DC excitation voltage is applied to field winding 10 to bring the field winding into synchronism with the rotating electric field in the armature winding 26.

To minimize torque transients when the field winding 10 is excited, the excitation voltage is applied to field winding 10 as the induced current in the field goes from negative to positive or while the poles in the field winding 10 are aligned with the "poles" in the rotating electric field. It is unlikely that the excitation voltage will be applied at the exact instant the induced field current goes from negative to positive since the unijunction transistor 112 is triggered by the square wave amplifier at a line frequency rate. Under the most extreme condition, the induced field current would go from negative to positive at the beginning of an 8.3 millisecond period, but the square wave amplifier would not be triggered until late in that period. Thus, it is possible that a delay of up to approximately 8 milliseconds may occur between the transition of the induced field current from negative to positive and the application of the DC excitation voltage to the field winding 10. A delay of this magnitude is inconsequential since the speed of the field winding 10 relative to the speed of the rotating electric field is quite low at the threshold speed. Because of this low relative speed, the poles of the field winding 10 will slip only a few degrees beyond the "poles" of the rotating electric field before the DC excitation voltage is applied.

While there has been described at present what is thought to be a preferred embodiment of the present invention, variations and modifications therein will occur to those skilled in the art. Therefore, it is intended that the appended claims shall include all such variations and modifications as fall within the true spirit and scope of the invention.

What is claimed is:

1. An excitation control system for use with the field winding of a synchronous motor including:
    (a) a bistable circuit capable of operating in a start mode or a run mode;
    (b) a threshold speed detector for driving said bistable circuit into its run mode during half cycles of induced field current having a first polarity when the field winding is rotating at speeds equal to or greater than a subsynchronous threshold speed; and
    (c) an excitation control circuit including
        (1) a threshold device having first and second base circuits and an emitter circuit, the emitter circuit being connected to said bistable circuit and to the field winding; and
        (2) means for applying a square wave voltage to one base terminal of said threshold device to drive said device into excitation-initiating conduction at the beginning of the following half cycle of induced field current having a second polarity when said bistable circuit is in its run mode.

2. An excitation control system as recited in claim 1 wherein said threshold speed detector includes:
    (a) a second threshold device having an output connected to said bistable circuit;
    (b) a charging capacitor for triggering said second threshold device upon the accumulation of a predetermined charge so as to produce a mode changing signal on the output thereof;
    (c) means for charging said capacitor at a set rate during half cycles of induced field current having the first polarity; and
    (d) means for discharging said capacitor during half cycles of induced field current having the second polarity.

3. An excitation control circuit as recited in claim 1 further including means for resetting said bistable circuit into its start mode at the beginning of the same half cycles in which the threshold speed detector may later drive said circuit into its run mode, whereby a decision is made during each of the half cycles whether excitation can be initiated at the beginning of the next half cycle of the opposite polarity.

4. An excitation control circuit as recited in claim 3 further including means for resetting said bistable circuit into its start mode at the beginning of the same half cycles in which the threshold speed detector may later drive said circuit into its run mode, whereby a decision is made during each of the half cycles whether excitation can be initiated at the beginning of the next half cycle of the opposite polarity.

References Cited

UNITED STATES PATENTS 3,308,362    3/1967    Neumann et al. __ 318—183 XR

ORIS L. RADER, Primary Examiner

GENE RUBINSON, Assistant Examiner

U.S. Cl. X.R.

318—181, 183, 193